Jan. 14, 1969   J. B. STOUGHTON   3,421,163
ORTHOPEDIC CUSHION
Filed Nov. 14, 1966
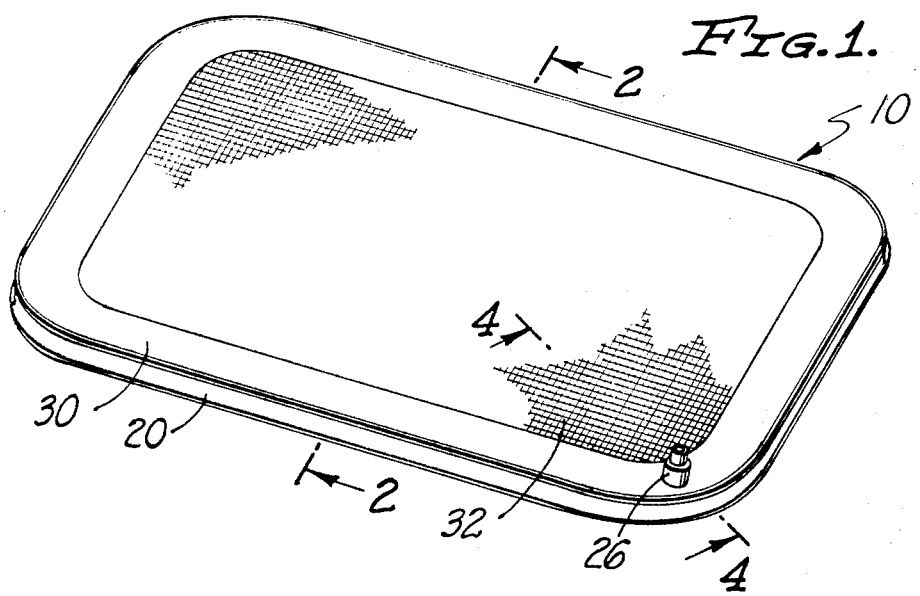
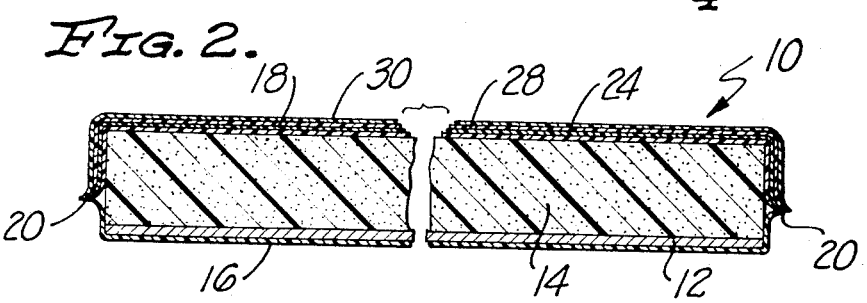
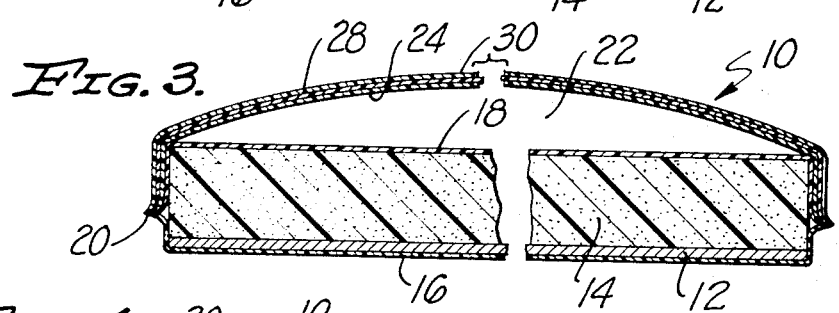
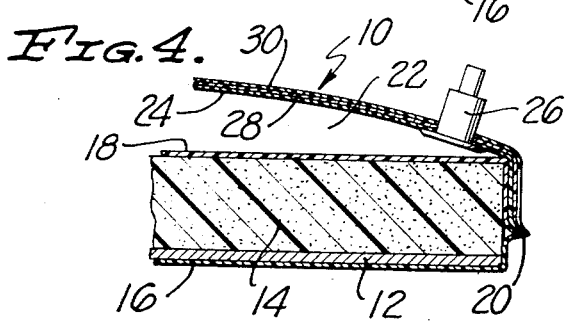
INVENTOR.
JOSEPH B. STOUGHTON
BY
EDWARD D. O'BRIAN
ATTORNEY

United States Patent Office 3,421,163
Patented Jan. 14, 1969

3,421,163
ORTHOPEDIC CUSHION
Joseph B. Stoughton, 1218 E. Culver,
Orange, Calif. 92667
Filed Nov. 14, 1966, Ser. No. 594,181
U.S. Cl. 5—348                                          3 Claims
Int. Cl. A47c 27/08

ABSTRACT OF THE DISCLOSURE

This invention is directed to an orthopedic cushion, and particularly to an orthopedic cushion which serves as a back rest cushion and combines the advantages of an air cushion with a foam in such manner that interaction between the two different back supporting methods produces massage-like action. The cushion comprises a relatively inflexible back board. In front of the back board is positioned a resilient cushion of such nature that it tends to retain its uniform thickness. A single piece of foamed polymer composition material is suitable for this purpose. Positioned in front of the foam cushion is an air envelope which is adapted to be inflated to provide air cushion support. In the preferred construction a single envelope contains the back board, the foam cushion and the air envelope. However, it is desirable that a separate air envelope be used so that the air envelope is separated from the foam cushion. Thus, the air envelope is positioned interiorly of the enclosing envelope and in front of the foam cushion. If desired, a suitable high friction covering can be placed over the exterior to form part of the enclosing envelope. This high friction surface is preferably positioned on the front of the cushion above the air envelope to retain the back in position with respect to the cushion.

---

Further progress is always necessary in the orthopedic arts. The orthopedic arts suit appliances to human needs. The appliances are continually developed as more understanding of human needs is obtained and as further materials permit improvement of the orthopedic devices and their association with a person. Various orthopedic cushions are well known. These include air cushions which provide total air support to provide exact contour support. However, in some cases such total air cushions are unsatisfactory because of the complete separation of the back from the ultimate supporting surface, such as an automobile seat. In driving an automobile, the driver must have more reference to the car motion than an air cushion will provide. Furthermore, in some orthopedic conditions, some parts of the body require more firm support than other and this is not obtainable in the usual air cushion structure. On the other hand, foam cushions have been contoured to the person for orthopedic purposes. These foam cushions provide adequate support and can be arranged for the proper support pressure in different areas. However, their inherent firmness is much greater than that provided by the air cushion, and this is a disadvantage in some applications.

Furthermore, the advantages of the combined air cushions having a bare minimum of inflation and a relatively firm foam cushion have not previously been recognized. Such a combined cushion provides partial support through air cushioning and the remainder of the support through the foam cushion. When this results, relative motion such as is obtained in automobile travel causes shifting of the air in the air envelope to cause different parts of contact between the person's back and the foam cushion. This results in a massaging effect, which was previously unrecognized.

Description

Accordingly, it is an object of this invention to provide an orthopedic cushion which provides selective air cushioning with soft cushion support. It is another object of this invention to provide an orthopedic cushion which contains both the foam cushion and an air envelope so that the advantages of each type of support are readily obtained. It is still another object of this invention to provide an orthopedic cushion in which the air envelope and the foam cushion both provide support when the air envelope is properly inflated so that a portion of the back rest is provided by the foam cushion through an area of the envelope in which there is no air, and other portions are supported by air in the envelope, depending on the contour of the back being supported. Other objects and advantages of this invention will become apparent from a study of the following portion of this specification, the claims and the attached drawings.

FIG. 1 is a perspective view of the orthopedic cushion of this invention.

FIG. 2 is an enlarged section of the orthopedic cushion, with parts broken away, taken along the line 2—2 of FIG. 1.

FIG. 3 is a section similar to the section of FIG. 2, showing the air envelope partially inflated.

FIG. 4 is an enlarged section, with parts broken away, taken generally along the line 4—4 of FIG. 1.

Referring now to the drawings, the orthopedic cushion of this invention is generally indicated at 10. The cushion 10 is built up of a plurality of elements. Back board 12 is preferably coextensive with the lateral outlines of the cushion 10 and is of relatively rigid material. Phenolic impregnated fiber board available under the trademark "Masonite" is suitable for this purpose. The back board 12 has some flexibility, but generally defines the flat character of the back of cushion 10.

Foam cushion 14 is laterally coextensive with back board 12 and is preferably made out of flexible foamed synthetic polymer composition material. Polyurethane foam in a relatively light density is suitable for this cushion. Back board 12 and foam cushion 14 may be adhesively secured together to prevent lateral shifting, if desired. However, in normal usage, the coefficient of friction between the back board and foam cushion 14 is sufficient to prevent such motion, especially when they are enclosed in the same envelope.

An envelope encloses back board 12 and foam cushion 14. This envelope is comprised of layer 16 of material which extends around the back of cushion 10 and outside of back board 12. Further comprising the envelope is layer 18. Layer 18 is preferably of substantially air impervious, flexible, synthetic polymer composition material. Polyethylene sheet is suitable. Layers 16 and 18 are sealed together continuously around the lateral edges of cushion 10 by means of seal joint 20. When layer 16 is made of the same material as layer 18, heat sealing or other convenient sealing methods compatible with the kind of material is possible.

Air envelope 22 is formed by layer 18 on its side toward cushion 14 and by layer 24 on its upper side. Layer 24 is again of substantially air impervious flexible material, and is preferably made of synthetic polymer composition sheet material, such as polyethylene film. Layer 24 is also sealed along seal edge 20 in continuous manner to layer 18 to form an air tight air envelope. Air valve 26 is placed in layer 24 to permit the charging of envelope with an appropriate amount of air. Further air may be introduced into the envelope through air valve 26, and if necessary, air can be let out of envelope 22 through air valve 26. Thus, air valve 26 permits air flow in either direction when it is open, and flow when it is closed. Such air valves are conventional in air matresses, air cushions and the like.

Layer 28 is again preferably made of air impervious, flexible synthetic polymer composition material, for example polyethylene sheet. Layer 28 serves as a protection against puncture for layer 24. Layer 28 is also sealed at seal edge 20.

In view of this double thickness of air impervious material, top layer 30 need not be air impervious. Preferably it carries an insert 32 which is of relatively high coefficient of friction material with the respect to the person's back which will rest against it. Thus, insert 32 can be of woven strips of synthetic material. Furthermore, it may not be an insert but may simply be a patterned area of top layer 30. Top layer 30 is also sealed to the remainder of orthopedic cushion 10 along seal edge 20. For this reason at least the outer edge of top layer 30 is of such nature as to be sealable to the remaining layers. Thus, the outline edge of layer 30 is preferably of polyethylene sheet.

The orthopedic cushion 10 of this invention is particularly designed to be an orthopedic back rest. In use, it is placed against a normal back rest surface. In preferable use, it is used as a back rest in an automobile, for the motion of the automobile brings out the finest orthopedic characteristics of the cushion 10. Thus, it is placed against the seat back in an automobile. An appropriate amount of air is introduced into envelope 22 through valve 26, which is thereupon closed. When properly inflated, the curvature of the person's back causes sufficient depression of portions of the air envelope so that portions of this back force all of the air out of those portions of air envelope 22 and those portions of his back rest against foam cushion 14. Those portions of his back which do not extend so far back, for example the small of his back, are supported by the air cushion 22, which is thrust into that position by the squeezing of the upper, shoulder area of the air envelope. Thus, in proper use, a portion of the back is resting on air in the air envelope 22 and a portion is resting against the foam cushion 14.

The normal motion of the automobile causes changes in loading of the person's back against cushion 10 so that the position of the air in air envelope 22 continually changes. Thus, different portions of the person's back are supported on air and different portions on foam cushion 14 at different times. This shifting occurs relatively rapidly upon normal automobile motion and causes a massaging effect upon the back muscles. It is seen that orthopedic cushion 10 combines the advantageous results of an air cushion for continuous, even pressure support over a certain area and the advantage of the foam cushion 14 in providing a firm support over a different area, which areas are continually shifting, so as to obtain a new, advantageous result from the combination. This result is in the massage-like effect which is believed to be of considerable orthopedic value. For different persons, different amounts of air are used in the air envelope 22 to provide the optimum combined support for the figure and size of a particular individual. Through changes in the amount of air in the air envelope 22, the cushion 10 is adjustable to be suitable to any person, and any person can obtain the beneficial massage-like effect of the orthopedic cushion 10.

This invention having been described in its preferred embodiment, it is clear that it is susceptible to numerous modifications and changes within the ability of those skilled in the art and without the exercise of the inventive faculty. Accordingly, the scope of this invention is defined by the scope of the following claims.

What is claimed is:
1. An orthopedic cushion, said orthopedic cushion comprising:
   a substantially flat and substantially rigid backboard having edges;
   a foam cushion, said foam cushion being of substantially uniform thickness, said foam cushion being positioned against said backboard, said foam cushion having edges, said edges of said foam cushion being substantially in line with the edges of said backboard;
   an air envelope, said air envelope being positioned against said foam cushion, said air envelope having edges, said air envelope being adapted to contain an appropriate amount of air so that a person resting his back upon said orthopedic cushion rests partially against said foam cushion and rests partially against air in said air envelope;
   said air envelope comprising first and second layers, said first layer being in engagement with said foam cushion, each of said layers being layers of flexible, susbtantially air impervious material;
   a back layer engaged around at least said backboard and secured to said first layer so that said first layer and said back layer embrace said foam cushion and said backboard and said first layer comprises one side of said air envelope;
   said first layer, said second layer and said back layer being sealed together at a sealing edge; and
   a top layer positioned over said second layer of said air envelope, said top layer forming a back rest for the person using said orthopedic cushion, said top layer being secured to the other of said layers at said sealing edge.
2. The orthopedic cushion of claim 1 wherein an intermediate protective layer is positioned between said top layer and said second layer, said intermediate protection layer being of flexible, substantially air impervious material, said intermediate protective layer being sealed to said second layer at said sealing edge.
3. An orthopedic cushion, said orthopedic cushion comprising:
   a substantially flat and substantially rigid backboard having edges;
   a foam cushion, said foam cushion being of substantially uniform thickness, said foam cushion being positioned against said backboard, said foam cushion having edges, said edges of said foam cushion being substantially in line with the edges of said backboard;
   an air envelope, said air envelope being positioned against said foam cushion, said air envelope having edges, said air envelope being adapted to contain an appropriate amount of air so that a person resting his back upon said orthopedic cushion rests partially against said foam cushion and rests partially against air in said air envelope; and
   cover layer means extending around and covering and holding together said air envelope, said foam cushion and said backboard.

References Cited
UNITED STATES PATENTS

| | | | |
|---|---|---|---|
| 3,042,940 | 7/1962 | Keaton | 5—348 |
| 3,222,694 | 12/1965 | Schick | 5—338 |
| 3,271,797 | 9/1966 | Boyce | 5—348 |

BOBBY R. GAY, Primary Examiner.

A. CALVERT, Assistant Examiner.

U.S. Cl. X.R.

297—453